(12) United States Patent
Zhu et al.

(10) Patent No.: US 12,537,477 B1
(45) Date of Patent: Jan. 27, 2026

(54) PHOTOVOLTAIC ARRAY TRACKING BRACKET AND CONTROL METHOD THEREOF

(71) Applicant: Huaneng Qinghai Power Generation Co., Ltd., Qinghai (CN)

(72) Inventors: Gengfeng Zhu, Qinghai (CN); Jia Zhang, Qinghai (CN); Anzhou Deng, Qinghai (CN); Shiming Xu, Qinghai (CN)

(73) Assignee: Huaneng Qinghai Power Generation Co., Ltd., Xining (CN)

( * ) Notice: Subject to any disclaimer, the term of this patent is extended or adjusted under 35 U.S.C. 154(b) by 0 days.

(21) Appl. No.: 19/195,636

(22) Filed: Apr. 30, 2025

(30) Foreign Application Priority Data

Jul. 23, 2024 (CN) .......................... 202410991074.X

(51) Int. Cl.
*H02S 20/32* (2014.01)
*G05D 3/10* (2006.01)

(52) U.S. Cl.
CPC ............. *H02S 20/32* (2014.12); *G05D 3/105* (2013.01)

(58) Field of Classification Search
CPC ................................ H02S 20/32; G05D 3/105
See application file for complete search history.

(56) References Cited

U.S. PATENT DOCUMENTS

2012/0004780 A1* 1/2012 Miller ................... H10F 77/955
700/286

FOREIGN PATENT DOCUMENTS

| CN | 113691196 A | 11/2021 |
|---|---|---|
| CN | 116520933 A | 8/2023 |

\* cited by examiner

*Primary Examiner* — Jayne L Mershon

(57) ABSTRACT

A photovoltaic array tracking bracket and a control method thereof are provided. The solar illumination point on the photovoltaic array is determined based on the solar illumination area; the power generation influence information and solar illumination information of the solar illumination points are collected, and the tracking credible value of the solar illumination point is calculated based on the analysis results; the compensation coefficient of the solar illumination point is set based on historical power generation information, and the tracking credible value is compensated according to the compensation coefficient to obtain the target tracking credible value; all the target tracking credible values are sorted in numerical size, and the target solar illumination point corresponding to the maximum target tracking credible value is extracted; a comparison point is selected on the photovoltaic array, and the photovoltaic array is controlled based on the target solar illumination point and the comparison point.

2 Claims, 1 Drawing Sheet

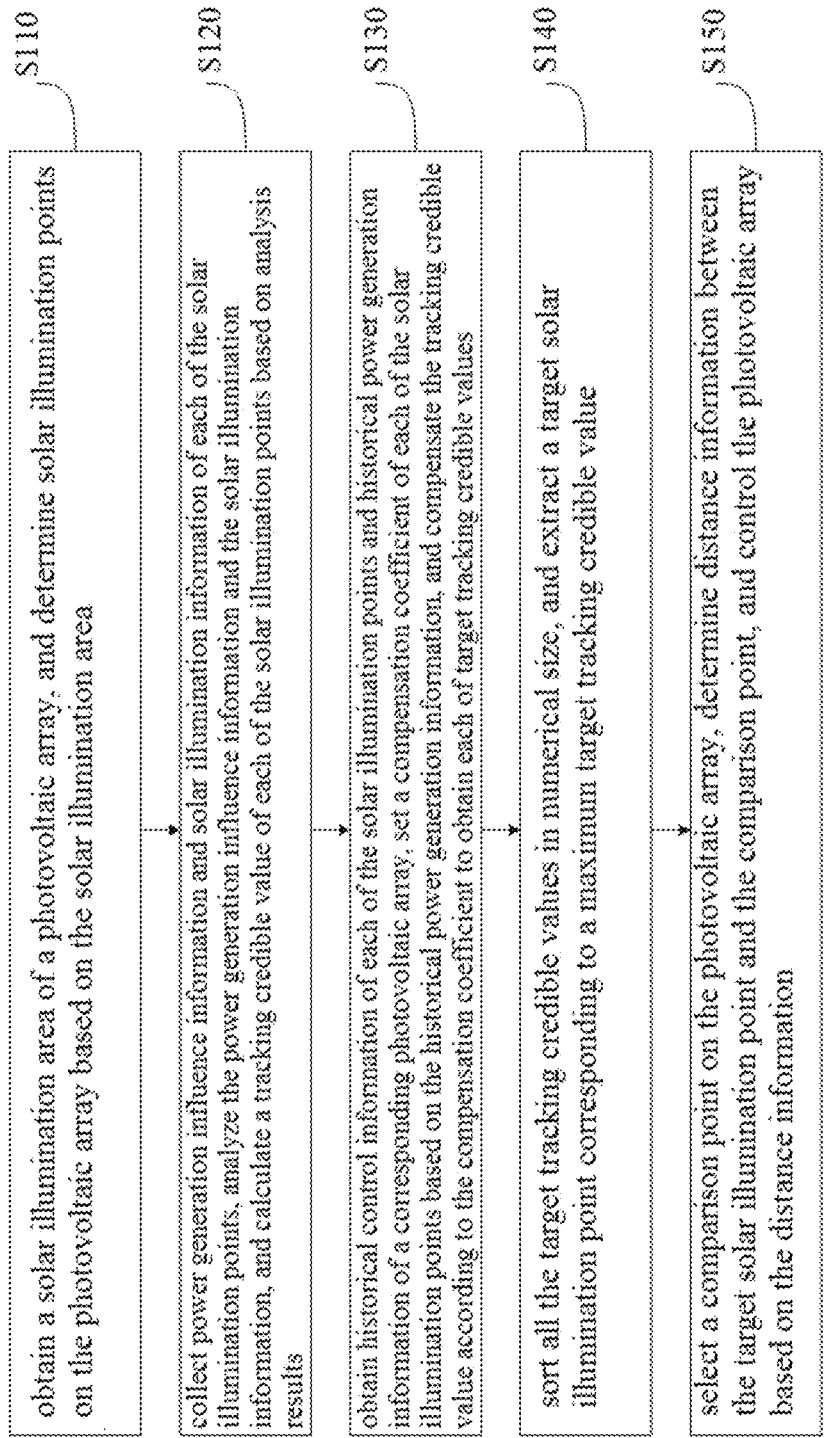

PHOTOVOLTAIC ARRAY TRACKING BRACKET AND CONTROL METHOD THEREOF

CROSS-REFERENCE TO RELATED APPLICATION

This application claims priority of Chinese Patent Application No. 202410991074.X, filed on Jul. 23, 2024, the entire contents of which are incorporated herein by reference.

TECHNICAL FIELD

The disclosure relates to the technical field of photovoltaic arrays, in particular to a photovoltaic array tracking bracket and a control method thereof.

BACKGROUND

In the solar photovoltaic power generation system, in order to improve the power generation efficiency, the photovoltaic array usually needs to face the sun to obtain the maximum illumination intensity. Therefore, various types of photovoltaic array tracking bracket systems have been developed. These systems can be divided into two categories: single-axis tracking system and dual-axis tracking system. The single-axis tracking system allows the photovoltaic array to rotate around a horizontal axis, so as to follow the east-west direction of the sun during the day. The dual-axis tracking system has gone a step further. Besides the east-west tracking, it can also realize the adjustment of photovoltaic array around the vertical axis and track the north-south change of the sun's height.

In the prior art, the photovoltaic array tracking bracket usually includes a bracket structure, a driving motor, a transmission mechanism, a control unit, a sensor and other components. The control system commands the driving motor to adjust the angle of the bracket according to the data collected from the sensor (such as the position of the sun, ambient light intensity, etc.) to ensure the photovoltaic panel to obtain the optimal illumination. However, in the prior art, the operation of the tracking system needs to consume a certain amount of electric energy, especially in cloudy or poor lighting conditions, which reduces the energy efficiency ratio of the whole photovoltaic system, and sometimes the energy consumption of the tracking system is greater than the electric energy generated by photovoltaic modules.

SUMMARY

The embodiment of the disclosure provides a photovoltaic array tracking bracket and a control method thereof, which are used for solving the technical problems that the photovoltaic array cannot be intelligently controlled and the power generation efficiency and energy utilization rate of the photovoltaic array cannot be effectively improved in the prior art.

In order to achieve the above object, the disclosure provides a control method for a photovoltaic array tracking bracket, which includes the following steps:

obtaining a solar illumination area of a photovoltaic array, and determining solar illumination points on the photovoltaic array based on the solar illumination area;

collecting power generation influence information and solar illumination information of each of the solar illumination points, analyzing the power generation influence information and the solar illumination information, and calculating a tracking credible value of each of the solar illumination points based on analysis results;

obtaining historical control information of each of the solar illumination points and historical power generation information of a corresponding photovoltaic array, setting a compensation coefficient of each of the solar illumination points based on the historical power generation information, and compensating the tracking credible value according to the compensation coefficient to obtain each of target tracking credible values;

sorting all the target tracking credible values in numerical size, and extracting a target solar illumination point corresponding to a maximum target tracking credible value;

selecting a comparison point on the photovoltaic array, and controlling the photovoltaic array based on the target solar illumination point and the comparison point.

Further, collecting power generation influence information and solar illumination information of each of the solar illumination points, analyzing the power generation influence information and the solar illumination information, and calculating a tracking credible value of each of the solar illumination points based on analysis results include:

generating a time-solar illumination intensity information chain according to the solar illumination information based on solar illumination collection time;

analyzing the time-solar illumination intensity information chain, and calculating a first credible influence value of the solar illumination points according to each solar illumination intensity and a corresponding illumination duration time;

$$a1 = e \times b + c \times f$$

where $a1$ is the first credible influence value of the solar illumination points, $e$ is a solar illumination intensity corresponding to each of the solar illumination points, $b$ is a weight corresponding to the solar illumination intensity, $c$ is an illumination duration time corresponding to each of the solar illumination points, and $f$ is a weight corresponding to the illumination duration time;

analyzing the power generation influence information of each of the solar illumination points, and dividing the power generation influence information into self-influence information and association influence information;

constructing a self-influence information sequence according to all the self-influence information, and constructing an association influence information sequence according to the association influence information;

determining a self-standard influence information range sequence corresponding to the self-influence information sequence, and determining an association standard influence information range sequence corresponding to the association influence information sequence;

generating corresponding first positive score values from self-influence information of conforming to the self-standard influence information range sequence in the self-influence information sequence;

generating corresponding first negative score values from self-influence information of failing to conform to the self-standard influence information range sequence in the self-influence information sequence;

generating corresponding second positive score values from association influence information of conforming to the association standard influence information range sequence in the association influence information sequence;

generating corresponding second negative score values from association influence information of failing to conform to the association standard influence information range sequence in the association influence information sequence;

calculating a second credible influence value a2 of each of the solar illumination points according to the first positive score values, the first negative score values, the second positive score values and the second negative score values;

calculating a product value Aa of the first credible influence value a1 and the second credible influence value a2, and taking the product value as a tracking credible value corresponding to each of the solar illumination points.

Further, calculating a second credible influence value a2 of each of the solar illumination points according to the first positive score values, the first negative score values, the second positive score values and the second negative score values includes:

calculating the second credible influence value a2 of each of the solar illumination points according to following formula:

$$a2 = g1 \times \left( \frac{h1 \times \sum_{i=1}^{n1} |ki - k_{average}| + h2 \times \sum_{j=1}^{n2} |nj - n_{average}|}{n1 + n2} \right)^{\frac{h2}{h1}} +$$

$$g2 \times \left( \frac{h3 \times \sum_{x=1}^{m1} |px - p_{average}| + h4 \times \sum_{y=1}^{m2} |qy - q_{average}|}{m1 + m2} \right)^{\frac{h4}{h3}}$$

where g1 is a weight corresponding to the self-influence information sequence, h1 is a calculation coefficient corresponding to the first positive score values, n1 is a number of the first positive score values, ki is an i-th first positive score value, $k_{average}$ is an average value obtained for calculating the first positive score values, h2 is a calculation coefficient corresponding to the first negative score values, n2 is a number of the first negative score values, nj is a j-th first negative score value, and average is an average value obtained for calculating the first negative score values; g2 is a weight corresponding to the association influence information sequence, h3 is a calculation coefficient corresponding to the second positive score values, m1 is a number of the second positive score values, px is an x-th second positive score value, $p_{average}$ is an average value obtained for calculating the second positive score values, h4 is a calculation coefficient corresponding to the second negative score values, m2 is a number of the second negative score values, qy is a y-th second negative score value, and $q_{average}$ is an average value obtained for calculating the second negative score values.

Further, obtaining historical control information of each of the solar illumination points and historical power generation information of a corresponding photovoltaic array, setting a compensation coefficient of each of the solar illumination points based on the historical power generation information, and compensating the tracking credible value according to the compensation coefficient to obtain each of target tracking credible values includes:

collecting output current and output voltage of the photovoltaic array in a preset time period;

calculating a historical power generation efficiency of a corresponding photovoltaic array according to the output current and the output voltage;

presetting a first preset historical power generation efficiency and a second preset historical power generation efficiency;

presetting a first preset compensation coefficient, a second preset compensation coefficient and a third preset compensation coefficient;

when a first preset compensation condition is identified, calculating a product value of the first preset compensation coefficient and the tracking credible value, and taking the product value as each of the target tracking credible values;

when a second preset compensation condition is identified, calculating a product value of the second preset compensation coefficient and the tracking credible value, and taking the product value as each of the target tracking credible values;

when a third preset compensation condition is identified, calculating a product value of the third preset compensation coefficient and the tracking credible value, and taking the product value as each of the target tracking credible values; where the first preset compensation condition is the historical power generation efficiency being less than the first preset historical power generation efficiency, the second preset compensation condition is the historical power generation efficiency being greater than or equal to the first preset historical power generation efficiency and less than the second preset historical power generation efficiency, and the third preset compensation condition is the historical power generation efficiency being greater than or equal to the second preset historical power generation efficiency.

Further, calculating a historical power generation efficiency of a corresponding photovoltaic array according to the output current and the output voltage includes:

calculating the historical power generation efficiency of corresponding photovoltaic array according to following formula:

$$R = \exp\left[\frac{v(U + IR_{series})}{swT} - 1\right] - \frac{(U + IR_{series})}{R_{parallel}}$$

where R is the historical power generation efficiency of the photovoltaic array, v is an electron charge, U is the output voltage, I is the output current, $R_{series}$ is series resistance, s is a calculation coefficient, w is a Boltzmann constant, T is an absolute temperature, and $R_{parallel}$ is parallel resistance.

Further, selecting a comparison point on the photovoltaic array, and controlling the photovoltaic array based on the target solar illumination point and the comparison point includes:

deploying an infrared emitting device at the comparison point and deploying an infrared receiving device at the target solar illumination point;

controlling the infrared emitting device to emit infrared rays to the infrared receiving device based on a first time node, and recording a second time node when the infrared receiving device receives the infrared rays;

calculating a time node difference value between the first time node and the second time node, and setting a driving power of the photovoltaic array according to the time node difference value.

Further, setting a driving power of the photovoltaic array according to the time node difference value includes:

presetting a first preset time node difference value and a second preset time node difference value;

presetting a first preset driving power, a second preset driving power and a third preset driving power;

when a first preset driving condition is identified, taking the first preset driving power as a driving power of the photovoltaic array;

when a second preset driving condition is identified, taking the second preset driving power as a driving power of the photovoltaic array;

when a third preset driving condition is identified, taking the third preset driving power as a driving power of the photovoltaic array; where the first preset driving condition is the time node difference value being less than the first preset time node difference value, the second preset driving condition is the time node difference value being greater than or equal to the first preset time node difference value and less than the second preset time node difference value, and the third preset driving condition is the time node difference being greater than or equal to the second preset time node difference.

Further, a photovoltaic array tracking bracket is provided and includes:

a photovoltaic array tracking bracket, a supporting assembly, a main controller, a collection device, an obtaining device and a driving motor, where the collection device, the obtaining device and the driving motor are fixed on the photovoltaic array tracking bracket and are respectively electrically connected with the main controller; the supporting assembly is connected with an output end of the driving motor, and the supporting assembly is rotatably connected with a main body; the main controller is used for controlling the driving motor according to received control instructions.

Compared with the prior art, the disclosure has the following beneficial effects.

The disclosure provides a photovoltaic array tracking bracket and a control method thereof. The solar illumination point on the photovoltaic array is determined based on the solar illumination area; the power generation influence information and solar illumination information of the solar illumination points are collected, and the tracking credible value of the solar illumination point is calculated based on the analysis results; the compensation coefficient of each of the solar illumination points is set based on historical power generation information, and the tracking credible value is compensated according to the compensation coefficient to obtain the target tracking credible value; all the target tracking credible values are sorted in numerical size, and the target solar illumination point corresponding to the maximum target tracking credible value is extracted; a comparison point is selected on the photovoltaic array, and the photovoltaic array is controlled based on the target solar illumination point and the comparison point, so as to realize the intelligent control of the photovoltaic array tracking bracket, ensure the control accuracy and efficiency, effectively improve the power generation efficiency and energy utilization rate of the photovoltaic array, and reduce the control energy consumption of the photovoltaic array tracking bracket.

BRIEF DESCRIPTION OF THE DRAWINGS

Various other advantages and benefits will become clear to those skilled in the art by reading the following detailed description of the preferred embodiments. The drawings are only for the purpose of illustrating the preferred embodiment, and are not considered as limiting the disclosure. Moreover, the same reference numerals are used to indicate the same parts. In the attached drawings.

FIG. 1 shows a flowchart of a control method for a photovoltaic array tracking bracket according to an embodiment of the disclosure.

DETAILED DESCRIPTION OF THE EMBODIMENTS

In the following, the specific embodiments of the disclosure will be described in further detail with the attached drawings and embodiments. The following embodiments are used to illustrate the disclosure, but are not used to limit the scope of the disclosure.

In the description of the disclosure, it should be understood that the azimuth or positional relationship indicated by the terms "center", "up", "down", "front", "back", "left", "right", "vertical", "horizontal", "top", "bottom", "inside" and "outside" is based on the azimuth or positional relationship shown in the attached drawings, only for the convenience of describing this disclosure and simplifying the description, and does not indicate or imply that the referred device or element must have a specific orientation, be constructed and operated in a specific orientation, so it cannot be understood as a limitation of the disclosure.

The terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of this disclosure, unless otherwise specified, "multiple" means two or more.

In the description of this disclosure, it should be noted that unless otherwise specified and limited, the terms "installation", "connecting" and "connection" should be broadly understood, for example, they can be fixed connection, detachable connection or integral connection. They can be mechanical connection or electrical connection. They can be directly connected, can also be indirectly connected through an intermediate medium, and can be connected inside two elements. For those skilled in the art, the specific meanings of the above terms in this disclosure can be understood in specific circumstances.

The following is a description of preferred embodiments of the disclosure with reference to the accompanying drawings.

As shown in FIG. 1, an embodiment of the disclosure discloses a control method for a photovoltaic array tracking bracket, which includes the following steps.

S110: a solar illumination area of a photovoltaic array is obtained, and solar illumination points on the photovoltaic array are determined based on the solar illumination area.

In this embodiment, the solar illumination points can be set according to the area and complexity of the photovoltaic array, so as to meet the uniform arrangement.

S120: power generation influence information and solar illumination information of each of the solar illumination points are collected, the power generation influence information and the solar illumination information are analyzed, and a tracking credible value of each of the solar illumination points is calculated based on analysis results.

In some embodiments of the disclosure, collecting power generation influence information and solar illumination information of each of the solar illumination points, analyzing the power generation influence information and the solar illumination information, and calculating a tracking credible value of each of the solar illumination points based on analysis results include:

a time-solar illumination intensity information chain is generated according to the solar illumination information based on solar illumination collection time;

the time-solar illumination intensity information chain is analyzed, and a first credible influence value of the solar illumination points is calculated according to each solar illumination intensity and a corresponding illumination duration time;

$$a1 = e \times b + c \times f$$

where a1 is the first credible influence value of the solar illumination points, e is a solar illumination intensity corresponding to each of the solar illumination points, b is a weight corresponding to the solar illumination intensity, c is an illumination duration time corresponding to each of the solar illumination points, and f is a weight corresponding to the illumination duration time;

the power generation influence information of each of the solar illumination points is analyzed, and the power generation influence information is divided into self-influence information and association influence information;

a self-influence information sequence is constructed according to all the self-influence information, and an association influence information sequence is constructed according to the association influence information;

a self-standard influence information range sequence corresponding to the self-influence information sequence is determined, and an association standard influence information range sequence corresponding to the association influence information sequence is determined;

corresponding first positive score values are generated from self-influence information of conforming to the self-standard influence information range sequence in the self-influence information sequence;

corresponding first negative score values are generated from self-influence information of failing to conform to the self-standard influence information range sequence in the self-influence information sequence;

corresponding second positive score values are generated from association influence information of conforming to the association standard influence information range sequence in the association influence information sequence;

corresponding second negative score values are generated from association influence information of failing to conform to the association standard influence information range sequence in the association influence information sequence;

a second credible influence value a2 of each of the solar illumination points is calculated according to the first positive score values, the first negative score values, the second positive score values and the second negative score values;

a product value Δa of the first credible influence value a1 and the second credible influence value a2 is calculated, and the product value is taken as a tracking credible value corresponding to each of the solar illumination points.

In this embodiment, the receiving ability of photovoltaic array for sunlight is different, so the actual illumination intensity of each solar illumination point is different.

In this embodiment, the power generation influence information includes assembly efficiency, power generation loss amount, line loss, transformer loss, ambient temperature, ambient humidity, dust accumulation amount, etc. The above-mentioned assembly efficiency, power generation loss amount, line loss, transformer loss, etc. are self-influence information, while ambient temperature, ambient humidity, dust accumulation amount, etc. are association influence information.

In this embodiment, the association standard influence information range sequence includes a plurality of association standard influence information ranges.

The technical scheme has the beneficial effects that the first credible influence value of the solar illumination point is calculated according to each solar illumination intensity and the corresponding illumination duration time, the second credible influence value a2 of each solar illumination point is calculated according to the first positive score value, the first negative score value, the second positive score value and the second negative score value, and the tracking credible value of the solar illumination point is calculated according to the first credible influence value and the second credible influence value, so that the calculation accuracy is ensured, the errors caused by manual participation are avoided, which lays a foundation for the control of photovoltaic assembly array tracking bracket and provides reliable data support.

In some embodiments of the disclosure, calculating a second credible influence value a2 of each of the solar illumination points according to the first positive score values, the first negative score values, the second positive score values and the second negative score values includes:

the second credible influence value a2 of each of the solar illumination points is calculated according to following formula:

$$a2 = g1 \times \left( \frac{h1 \times \sum_{i=1}^{n1} |ki - k_{average}| + h2 \times \sum_{j=1}^{n2} |nj - n_{average}|}{n1 + n2} \right)^{\frac{h2}{h1}} + g2 \times \left( \frac{h3 \times \sum_{x=1}^{m1} |px - p_{average}| + h4 \times \sum_{y=1}^{m2} |qy - q_{average}|}{m1 + m2} \right)^{\frac{h4}{h3}}$$

where g1 is a weight corresponding to the self-influence information sequence, h1 is a calculation coefficient corresponding to the first positive score values, n1 is a number of the first positive score values, ki is an i-th first positive score value, $k_{average}$ is an average value obtained for calculating the first positive score values, h2 is a calculation coefficient corresponding to the first negative score values, n2 is a number of the first negative score values, nj is a j-th first negative score value, and $n_{average}$ is an average value obtained for calculating the first negative score values; g2 is a weight corresponding to the association influence information sequence, h3 is a calculation coefficient corresponding to the second positive score values, m1 is a number of the second positive score values, px is an x-th second positive score value, $p_{average}$ is an average value obtained for calculating the second positive score values, h4 is a calculation coefficient corresponding to the second negative score values, m2 is a number of the second negative score values, qy is a y-th second negative score value, and $q_{average}$ is an average value obtained for calculating the second negative score values.

S130: historical control information of each of the solar illumination points and historical power generation information of a corresponding photovoltaic array are obtained, a compensation coefficient of each of the solar illumination points is set based on the historical power generation information, and the tracking credible value is compensated according to the compensation coefficient to obtain each of target tracking credible values.

In some embodiments of the disclosure, obtaining historical control information of each of the solar illumination points and historical power generation information of a corresponding photovoltaic array, setting a compensation coefficient of each of the solar illumination points based on the historical power generation information, and compensating the tracking credible value according to the compensation coefficient to obtain each of target tracking credible values includes:

output current and output voltage of the photovoltaic array are collected in a preset time period;

a historical power generation efficiency of a corresponding photovoltaic array is calculated according to the output current and the output voltage;

a first preset historical power generation efficiency and a second preset historical power generation efficiency are preset;

a first preset compensation coefficient, a second preset compensation coefficient and a third preset compensation coefficient are preset;

when a first preset compensation condition is identified, a product value of the first preset compensation coefficient and the tracking credible value is calculated, and the product value is taken as each of the target tracking credible values;

when a second preset compensation condition is identified, a product value of the second preset compensation coefficient and the tracking credible value is calculated, and the product value is taken as each of the target tracking credible values;

when a third preset compensation condition is identified, a product value of the third preset compensation coefficient and the tracking credible value is calculated, and the product value is taken as each of the target tracking credible values; where the first preset compensation condition is the historical power generation efficiency being less than the first preset historical power generation efficiency, the second preset compensation condition is the historical power generation efficiency being greater than or equal to the first preset historical power generation efficiency and less than the second preset historical power generation efficiency, and the third preset compensation condition is the historical power generation efficiency being greater than or equal to the second preset historical power generation efficiency.

In this embodiment, the first preset historical power generation efficiency is less than the second preset historical power generation efficiency.

In this embodiment, 0.8<the first preset compensation coefficient<the second preset compensation coefficient<the third preset compensation coefficient<1.2.

The technical scheme has the beneficial effects that the compensation coefficient is selected according to the relationship among the historical power generation efficiency, the first preset historical power generation efficiency and the second preset historical power generation efficiency, and the tracking credible value is compensated, so that the intelligent control and precise control of the photovoltaic array tracking bracket can be further ensured, and the control singleness can be avoided.

S140: all the target tracking credible values are sorted in numerical size, and a target solar illumination point corresponding to a maximum target tracking credible value is extracted.

In this embodiment, if the number of maximum target tracking credible values is two or more, a target solar illumination point closest to the comparison point is selected.

S150: a comparison point on the photovoltaic array is selected, and the photovoltaic array is controlled based on the target solar illumination point and the comparison point.

In some embodiments of the disclosure, selecting a comparison point on the photovoltaic array, and controlling the photovoltaic array based on the target solar illumination point and the comparison point includes:

an infrared emitting device is deployed at the comparison point and an infrared receiving device is deployed at the target solar illumination point;

the infrared emitting device is controlled to emit infrared rays to the infrared receiving device based on a first time node, and a second time node is recorded when the infrared receiving device receives the infrared rays;

a time node difference value between the first time node and the second time node is calculated, and a driving power of the photovoltaic array is set according to the time node difference value.

In some embodiments of the disclosure, setting a driving power of the photovoltaic array according to the time node difference value includes:

a first preset time node difference value and a second preset time node difference value are preset;

a first preset driving power, a second preset driving power and a third preset driving power are preset;

when a first preset driving condition is identified, the first preset driving power is taken as a driving power of the photovoltaic array;

when a second preset driving condition is identified, the second preset driving power is taken as a driving power of the photovoltaic array;

when a third preset driving condition is identified, the third preset driving power is taken as a driving power of the photovoltaic array; where the first preset driving condition is the time node difference value being less than the first preset time node difference value, the second preset driving condition is the time node difference value being greater than or equal to the first preset time node difference value and less than the second preset time node difference value, and the third preset driving condition is the time node difference being greater than or equal to the second preset time node difference.

In this embodiment, the first preset time node difference value is smaller than the second preset time node difference value.

In this embodiment, the first preset driving power is less than the second preset driving power and less than the third preset driving power.

The technical scheme has the beneficial effects that the driving power of the photovoltaic array is set according to the relationship among the time node difference value, the first preset time node difference value and the second preset time node difference value, so that the driving energy consumption caused by driving the photovoltaic array tracking bracket can be effectively reduced, the power generation energy efficiency ratio can be effectively improved, and the phenomenon that the energy consumption is greater than the power generation can be avoided.

In order to further elaborate the technical idea of the disclosure, the technical scheme of the disclosure will now be described in combination with specific application scenarios.

Correspondingly, the disclosure also provides a photovoltaic array tracking bracket, which includes:
a photovoltaic array tracking bracket, a supporting assembly, a main controller, a collection device, an obtaining device and a driving motor, where the collection device, the obtaining device and the driving motor are fixed on the photovoltaic array tracking bracket and are respectively electrically connected with the main controller; the supporting assembly is connected with an output end of the driving motor, and the supporting assembly is rotatably connected with a main body; the main controller is used for controlling the driving motor according to received control instructions.

In some embodiments of the disclosure, the obtaining device is used for obtaining the solar illumination area of a photovoltaic array and determining the solar illumination point on the photovoltaic array based on the solar illumination area. The collection device is used for collecting the power generation influence information and the solar illumination information of each of the solar illumination points, analyzing the power generation influence information and the solar illumination information, and calculating the tracking credible value of each of the solar illumination points based on the analysis results. The obtaining device is used for obtaining the historical control information of each of the solar illumination points and the historical power generation information of the corresponding photovoltaic array, setting the compensation coefficient of each of the solar illumination points based on the historical power generation information, and compensating the tracking credible value according to the compensation coefficient to obtain the target tracking credible value. The main controller is used for sorting all the target tracking credible values in numerical size and extracting the target solar illumination point corresponding to the maximum target tracking credible value; selecting a comparison point on the photovoltaic array, determining the distance information between the target solar illumination point and the comparison point, and controlling the photovoltaic array based on the distance information.

In the description of the above embodiments, specific features, structures, materials or characteristics can be combined in any one or more embodiments or examples in a suitable way.

Although the disclosure has been described above with reference to embodiments, various modifications can be made to it and parts thereof can be replaced by equivalents without departing from the scope of the disclosure. In particular, as long as there is no structural conflict, all the features in the disclosed embodiments of the disclosure can be combined with each other in any way, and all these combinations are not described in this description only for the sake of omitting space and saving resources.

It can be understood by those skilled in the art that the above is only the preferred embodiment of the disclosure, and it is not used to limit the disclosure. Although the disclosure has been described in detail with reference to the foregoing embodiments, it is still possible for those skilled in the art to modify the technical scheme described in the foregoing embodiments or to replace some of its technical features equally. Any modification, equivalent substitution, improvement, etc. made within the spirit and principle of the disclosure should be included in the protection scope of the disclosure.

The invention claimed is:

1. A control method for a photovoltaic array tracking bracket, comprising:
   obtaining a solar illumination area of a photovoltaic array, and determining solar illumination points on the photovoltaic array based on the solar illumination area by an obtaining device;
   collecting power generation influence information and solar illumination information of each of the solar illumination points, analyzing the power generation influence information and the solar illumination information, and calculating a tracking credible value of each of the solar illumination points based on analysis results by a collection device;
   obtaining historical control information of each of the solar illumination points and historical power generation information of a corresponding photovoltaic array, setting a compensation coefficient of each of the solar illumination points based on the historical power generation information, and compensating the tracking credible value according to the compensation coefficient to obtain each of target tracking credible values by the obtaining device;
   sorting all the target tracking credible values in numerical size, and extracting a target solar illumination point corresponding to a maximum target tracking credible value by a main controller;
   selecting a comparison point on the photovoltaic array, and controlling the photovoltaic array by a driving motor based on the target solar illumination point and the comparison point by the main controller;
   wherein said collecting power generation influence information and solar illumination information of each of the solar illumination points, analyzing the power generation influence information and the solar illumination information, and calculating a tracking credible value of each of the solar illumination points based on analysis results by a collection device comprise:
   generating a time-solar illumination intensity information chain according to the solar illumination information based on solar illumination collection time;
   analyzing the time-solar illumination intensity information chain, and calculating a first credible influence value of the solar illumination points according to each solar illumination intensity and a corresponding illumination duration time;

$$a1 = e \times b + c \times f$$

wherein a1 is the first credible influence value of the solar illumination points, e is a solar illumination intensity corresponding to each of the solar illumination points, b is a weight corresponding to the solar illumination intensity, c is an illumination duration time corresponding to each of the solar illumination points, and f is a weight corresponding to the illumination duration time;

analyzing the power generation influence information of each of the solar illumination points, and dividing the power generation influence information into self-influence information and association influence information;

constructing a self-influence information sequence according to all the self-influence information, and constructing an association influence information sequence according to the association influence information;

determining a self-standard influence information range sequence corresponding to the self-influence information sequence, and determining an association standard influence information range sequence corresponding to the association influence information sequence;

generating corresponding first positive score values from self-influence information of conforming to the self-standard influence information range sequence in the self-influence information sequence;

generating corresponding first negative score values from self-influence information of failing to conform to the self-standard influence information range sequence in the self-influence information sequence;

generating corresponding second positive score values from association influence information of conforming to the association standard influence information range sequence in the association influence information sequence;

generating corresponding second negative score values from association influence information of failing to conform to the association standard influence information range sequence in the association influence information sequence;

calculating a second credible influence value a2 of each of the solar illumination points according to the first positive score values, the first negative score values, the second positive score values and the second negative score values;

calculating a product value Aa of the first credible influence value a1 and the second credible influence value a2, and taking the product value as a tracking credible value corresponding to each of the solar illumination points;

wherein said calculating a second credible influence value a2 of each of the solar illumination points according to the first positive score values, the first negative score values, the second positive score values and the second negative score values comprises:

calculating the second credible influence value a2 of each of the solar illumination points according to following formula:

$$a2 = g1 \times \left( \frac{h1 \times \sum_{i=1}^{n1} |ki - k_{average}| + h2 \times \sum_{j=1}^{n2} |nj - n_{average}|}{n1 + n2} \right)^{\frac{h2}{h1}} +$$

$$g2 \times \left( \frac{h3 \times \sum_{x=1}^{m1} |px - p_{average}| + h4 \times \sum_{y=1}^{m2} |qy - q_{average}|}{m1 + m2} \right)^{\frac{h4}{h3}}$$

wherein g1 is a weight corresponding to the self-influence information sequence, h1 is a calculation coefficient corresponding to the first positive score values, n1 is a number of the first positive score values, ki is an i-th first positive score value, $k_{average}$ is an average value obtained for calculating the first positive score values, h2 is a calculation coefficient corresponding to the first negative score values, n2 is a number of the first negative score values, nj is a j-th first negative score value, and $n_{average}$ is an average value obtained for calculating the first negative score values; g2 is a weight corresponding to the association influence information sequence, h3 is a calculation coefficient corresponding to the second positive score values, m1 is a number of the second positive score values, px is an x-th second positive score value, $p_{average}$ is an average value obtained for calculating the second positive score values, h4 is a calculation coefficient corresponding to the second negative score values, m2 is a number of the second negative score values, qy is a y-th second negative score value, and $q_{average}$ is an average value obtained for calculating the second negative score values;

wherein said obtaining historical control information of each of the solar illumination points and historical power generation information of a corresponding photovoltaic array, setting a compensation coefficient of each of the solar illumination points based on the historical power generation information, and compensating the tracking credible value according to the compensation coefficient to obtain each of target tracking credible values by the obtaining device comprises:

collecting output current and output voltage of the photovoltaic array in a preset time period;

calculating a historical power generation efficiency of a corresponding photovoltaic array according to the output current and the output voltage;

presetting a first preset historical power generation efficiency and a second preset historical power generation efficiency;

presetting a first preset compensation coefficient, a second preset compensation coefficient and a third preset compensation coefficient;

when a first preset compensation condition is identified, calculating a product value of the first preset compensation coefficient and the tracking credible value, and taking the product value as each of the target tracking credible values;

when a second preset compensation condition is identified, calculating a product value of the second preset compensation coefficient and the tracking credible value, and taking the product value as each of the target tracking credible values;

when a third preset compensation condition is identified, calculating a product value of the third preset compensation coefficient and the tracking credible value, and taking the product value as each of the target tracking credible values; wherein the first preset compensation condition is the historical power generation efficiency being less than the first preset historical power generation efficiency, the second preset compensation condition is the historical power generation efficiency being greater than or equal to the first preset historical power generation efficiency and less than the second preset historical power generation efficiency, and the third preset compensation condition is the historical power generation efficiency being greater than or equal to the second preset historical power generation efficiency;

wherein said calculating a historical power generation efficiency of a corresponding photovoltaic array according to the output current and the output voltage comprises:

calculating the historical power generation efficiency of corresponding photovoltaic array according to following formula:

$$R = \exp\left[\frac{v(U + IR_{series})}{swT} - 1\right] - \frac{(U + IR_{series})}{R_{parallel}}$$

wherein R is the historical power generation efficiency of the photovoltaic array, v is an electron charge, U is the output voltage, I is the output current, $R_{series}$ is series resistance, s is a calculation coefficient, w is a Boltzmann constant, T is an absolute temperature, and $R_{parallel}$ is parallel resistance;

wherein said selecting a comparison point on the photovoltaic array, and controlling the photovoltaic array by a driving motor based on the target solar illumination point and the comparison point by the main controller comprises:

deploying an infrared emitting device at the comparison point and deploying an infrared receiving device at the target solar illumination point;

controlling the infrared emitting device to emit infrared rays to the infrared receiving device based on a first time node, and recording a second time node when the infrared receiving device receives the infrared rays;

calculating a time node difference value between the first time node and the second time node, and setting a driving power of the photovoltaic array according to the time node difference value;

wherein said setting a driving power of the photovoltaic array according to the time node difference value comprises:

presetting a first preset time node difference value and a second preset time node difference value;

presetting a first preset driving power, a second preset driving power and a third preset driving power;

when a first preset driving condition is identified, taking the first preset driving power as a driving power of the photovoltaic array;

when a second preset driving condition is identified, taking the second preset driving power as a driving power of the photovoltaic array;

when a third preset driving condition is identified, taking the third preset driving power as a driving power of the photovoltaic array; wherein the first preset driving condition is the time node difference value being less than the first preset time node difference value, the second preset driving condition is the time node difference value being greater than or equal to the first preset time node difference value and less than the second preset time node difference value, and the third preset driving condition is the time node difference being greater than or equal to the second preset time node difference.

2. A photovoltaic array tracking bracket, which is controlled by mean of a obtaining device, a collection device, a main controller, a driving motor, an infrared emitting device, and infrared receiving device which are configured to execute the control method for a photovoltaic array tracking bracket according to claim 1.

* * * * *